United States Patent Office 3,422,054
Patented Jan. 14, 1969

3,422,054
SEALANTS FOR STRUCTURAL MEMBERS
Peter B. Kelly, Austin, Tex., assignor to Jefferson Chemical Company, Inc., Houston, Tex., a corporation of Delaware
No Drawing. Filed Oct. 12, 1964, Ser. No. 403,362
U.S. Cl. 260—37                  3 Claims
Int. Cl. C08g 41/00; C08g 22/14

ABSTRACT OF THE DISCLOSURE

A polyurethane sealant having improved surface qualities is obtained when an aromatic isocyanate is reacted with a polyether polyol, containing from about 10 to about 60 mol percent of primary hydroxyl groups, made up of a mixture of a minor amount of a polyoxypropylene polyether triol and a major amount of a polyoxypropylene diol where the polyurethane includes about 30 to about 60 wt. percent of a filler which is from 15 to about 60 wt. percent calcium oxide.

---

This invention relates to sealant compositions. More particularly, this invention relates to pourable and moldable one-shot polyurethane compositions useful in the preparation of non-tacky seals for joints between structural members, such as masonry joints, window joints, expansion joints between segments of concrete, etc.

In sealing joints between structural members such as those formed from aluminum, iron, wood, masonry, glass, concrete, etc., it is necessary to establish an impermeable seal between the spaced surface which will be substantially completely impervious to moisture and which will at the same time have prolonged resistance to deterioration. In addition, the sealant should have at least residual flexibility so that it will not crack if there is limited relative movement between the surfaces defining the joint that is sealed.

One general type of sealant composition that has been proposed is one that can be poured as a liquid into horizontal joints and which will harden shortly after being poured to provide an adherent seal having the desired properties.

Such compositions are normally referred to as "pourable" compositions. Another type of sealant composition that is frequently employed is a moldable, semi-solid, putty-like composition which can be forced into a joint by a spatula, or other suitable trowling device, or into deeper openings by an appropriate caulking apparatus. Such compositions are normally referred to as "non-sagging" compositions. In general, "pourable" compositions may be used as a "non-sagging" composition on incorporation therein of a suitable thixotropic agent, such as a thixotropic agent as is hereinafter more fully described.

Over the years, a wide variety of materials have been considered for use in the preparation of sealant compositions. In recent years, polyurethanes, a class of synthetic polymeric materials, have been considered for this use. Polyurethanes possess a number of advantages, since they are comparatively low-cost materials that, at least potentially, can be formulated with comparative ease and supplied either as pourable or non-sagging compositions which will harden in place to provide products having the desired characteristics of a sealant. However, polyurethanes have not been entirely satisfactory for a number of reasons, such as poor storage stability, excessive fabrication costs and final sealants properties that are deficient in one respect or another.

It has been discovered in accordance with the present invention, however, that new and improved polyurethane compositions for use in the preparation of sealants for structural members can be prepared by the reaction of an aromatic polyisocyanate component with a polyol component, as hereafter defined, in the presence of calcium oxide. It will be understood, of course, that other conventional materials such as fillers, pigments, dyes, curing catalysts, thixotropic agents, etc., will also be present.

Polyurethanes are prepared from polyisocyanates and polyhydroxy compounds as a result of two distinct chemical reactions which normally have different degrees of reactivity. Thus, a linear chain extension reaction initially occurs between hydroxyl groups and isocyanato groups to provide interconnecting urethane bonds containing reactive secondary amino groups. The secondary amino groups, on further reaction with additional isocyanato groups, crosslink the polymer chains to provide the final product. Since two reactions are involved, it has heretofore been considered desirable and even necessary to conduct the overall process sequentially in a series of steps. This has been accomplished classically by first preparing a so-called "prepolymer" or "quasi-prepolymer" by reacting an aromatic polyisocyanate with a polyether polyol. The isocyanate is reacted with the polyhydroxy component in a molar ratio such that the reaction product will contain free isocyanato groups. Manifestly, when it is desired to provide a sealant composition, the prepolymer that is formed should be liquid or pasty under the conditions of use.

When it is desired to provide a final urethane sealant composition, the prepolymer is mixed with an additional quantity of polyether polyol, normally in the presence of a catalyst, together with fillers, dyes, and other suitable additives, to provide the cross-linking chemical reaction that will cure the sealant composition.

This system, though workable, is attendant with a great many disadvantages, particularly because of the undesirable side reactions that are involved. For example, since the prepolymer is only partially reacted and is still reactive, it normally has only limited storage stability, in that it will tend to polymerize on standing.

Another problem that is encountered with this type of materials is surface tack. Isocyanato groups, being reactive with hydroxyl groups, are capable of reacting with water such as the ambient water vapor present in the atmosphere. When this happens at the surface of a poured sealant composition, cross-linking is frequently inhibited to a significant extent, whereby the surface of the compoistion remains tacky for prolonged periods of time and even for an indefinite period of time. This is highly undesirable from the point of view of propensity of tacky surfaces to pick up lint, dust, dirt and other particles, and also because of the adverse effect that this may have on surface appearance or physical properties.

In accordance with the present invention, sealant compositions for structural members are provided which have the properties normally obtained with polyurethanes but which are substantially free from the surface tack problem that is encountered conventionally. In addition, another advantage of the present invention is the provision of a "one-shot" system for the preparation of polyurethane sealants which avoids the use of prepolymers.

In accordance with the present invention, sealant compositions for structural members are provided which have the properties normally obtained with polyurethanes but which are substantially free from the surface tack problem that is encountered conventionally. In addition, another advantage of the present invention is the provision of a "one-shot" system for the preparation of polyurethane sealants which avoids the use of prepolymers.

The compositions of the present invention are formed by the reactions that occur after mixing an aromatic polyisocyanate component (frequently referred to as the A component) with a polyol component, as hereinafter defined (frequently referred to as the B component). The B component will ordinarily comprise not only the polyol, but also an appropriate, conventional filler, such as calcium carbonate, a pigment such as titanium dioxide, etc., a minor amount of a catalyst such as an organo metallic compound and a controlled amount of calcium oxide. This mixture has comparatively good storage stability and is mixed with an A component consisting of isocyanate at the time of use. However, it is also possible, and in some instances preferable, to "store" the calcium oxide in the isocyanate component.

In accordance with the present invention, it is necessary to use calcium oxide. Calcium hydroxide is ineffective for eliminating surface tack and is not equivalent to calcium oxide for this purpose. This is likewise the case with other metal oxides such as lead oxide, zinc oxide, magnesium oxide, etc.

The A or isocyanate component will normally comprise one or more organic polyisocyanates. Aromatic diisocyanates and triisocyanates are preferred. Among the isocyanates that may be used are: toluene diisocyanate, 1,5-naphthalene diisocyanate, cumene-2,4-diisocyanate, 4-methoxy-1,3-phenylene diisocyanate 4-chloro-1,3-phenylene diisocyanate, 4-bromo-1,3-phenylene diisocyanate, 4-ethoxy-1,3-phenylene diisocyanate, 2,4'-diisocyanatodiphenylether, 4,4' - diisocyanatodiphenyl - ether, 2,4 - dimethyl-1,3-phenylene diisocyanate, benzidine diisocyanate, 9,10-anthracene diisocyanate, 4,4'-diisocyanatodibenzyl, 3,3 - dimethyl-4,4'-diisocyanatodiphenylmethane, 2,4-diisocyanatostilbene, 2,5-fluorene diisocyanate, 2,6-diisocyanatobenzofuran, etc., and mixtures thereof.

The polyisocyanate component is preferably composed of from about 80 to about 20 wt. percent of an aromatic diisocyanate and, correspondingly, from about 20 to about 80 wt. percent of aromatic polyisocyanates having a functionality greater than two. However, it is necessary that the isocyanate component have an average overall functionality of not more than about two to five.

Comparatively inexpensive isocyanate compositions can be employed with good results in the practice of the present invention. For example, mixed polyphenylmethane isocyanates may be used which are prepared by the reaction of an aromatic compound (e.g., aniline) with formaldehyde to provide a reaction product which is converted to polyisocyanates with only minimum purification. Of course, more expensive isocyanate components such as tolylene diisocyanates, diphenylmethane diisocyanates, naphthylene triisocyanates, or mixtures of any of these, etc., may be employed. However, there is an advantage to the present invention in that it is not mandatory to use expensive, comparatively pure isocyanates in order to obtain pipe sealant compositions having excellent physical properties. In addition, the crude isocyanate mixtures that are preferably employed (composed of diphenylmethane diisocyanates and higher polymers thereof) are significantly less toxic than more expensive and more volatile isocyanates such as crude mixtures of tolylene diisocyanates. However, for certain purposes it may be advantageous to add relatively small amounts of toluene diisocyanate or other difunctional isocyanate to the crude diphenylmethane diisocyanates to reduce the amount of cross-linking to enhance elongation and tear properties.

The polyether component to be used in accordance with the present invention is composed of a mixture of a minor amount of a polyoxypropylene polyether triol with a major amount of a polyoxypropylene diol; which polyether component contains from about 10 to about 60 mol percent of primary hydroxyl groups (based on the total mols of hydroxyl groups per average molecule).

A preferred polyoxyproplene diol component will have a molecular weight within the range from about 1,000 to about 5,000 and will be composed of from about 1 to about 15 wt. percent of ethylene oxide and, more preferably, from about 5 to about 10 wt. percent of ethylene oxide. The polyoxypropylene diol may be prepared in a conventional manner by reacting propylene oxide with an initiator containing two reactive hydrogen atoms in one or more stages in the presence of an alkali catalyst to provide an intermediate having about the desired molecular weight. The alkoxylation is then completed by ethoxylating the polyoxypropylene diol with ethylene oxide in any suitable conventional manner in the presence of an alkali catalyst.

The percentage of primary hydroxyl groups in the finished diol may be controlled within reasonable limits by controlling the amount of ethylene oxide that is employed. Theoretically, the reaction of one mol of ethylene oxide with one mol of polyoxypropylene diol will provide a final product having 50 mol percent of primary hydroxyl groups. In practice, however, it is necessary to use an excess of ethylene oxide to even approach this high a primary hydroxyl group content because of the pronounced tendency of ethylene oxide to react preferentially with the primary hydroxyl groups formed. Moreover, unless a gross excess of ethylene oxide is employed, the same tendency of ethylene oxide to react preferentially with the primary hydroxyl groups will prevent the formation of a final diol product having more than about 60 mol percent of primary hydroxyl groups.

The trifunctional polyhydroxy component is preferably a polyoxypropylene triol prepared by the reaction of propylene oxide with a trifunctional initiator (i.e., on containing three reactive hydrogen atoms per molecule). This may be accomplished in any conventional manner in one or more stages whereby propylene oxide is added in the presence of an alkali catalyst to provide an ultimate triol having an average molecular weight within the range from about 1,000 to about 6,000. If desired, the triol preparation method may include a terminal ethoxylation step with 1 to 15 wt. percent of ethylene oxide to provide a triol component containing from about 10 to about 50 mol percent of primary hydroxyl groups.

Since average functionality and average molecular weight are the primary criteria, it will be apparent that the triol component can be provided by mixing a diol with a triol or a tetrol, etc., in order to provide a triol having an average functionality of about three. However, this can only be done to a limited extent, since the polyol component of the present invention should be composed of more than 50% of diol.

It is to be observed in passing that the amount of triol that is called for is necessary for the practice of a one-shot method. The triol should be used in the indicated amount in that the use of an excessive amount of triol will result in excessively rapid cure which will shorten the pot life of the compositions.

The molar ratio of isocyanate in the A component to the polyol in the B component should be such that the isocyanato groups are present in at least an equivalent amount with respect to the hydroxyl groups. More preferably, an excess of isocyanato groups will be provided, such that the final composition will contain from about 1.1 to about 1.7 mol equivalents of isocyanato groups per mol equivalent of hydroxyl groups.

Gas bubbles are sometimes a problem in polyurethane sealant compositions. They may be formed as a result of the reaction of isocyanato groups with residual water in the B component, which reaction is characterized by the elimination of $CO_2$ as a by-product.

These problems can be minimized by using B components which have as low a water content as is reasonably practical (e.g., 0.02 wt. percent, or lower).

Although a catalyst is not absolutely necessary to the practice of the present invention, it is preferably employed.

When a catalyst is to be employed, it is preferably incorporated into the polyol component prior to the addition of the isocyanate component. Organo metallic catalysts are preferred such as the oxides, carboxylates or alcoholates of metals such as lead, tin or calcium. Representative examples of effective catalysts include dibutyltin diacetate, dibutyltin dilaurate, dibutyltin di-2-ethylhexoate, dibutyltin oxide, dibutyltin monomethoxymethylmaleate, tributyltin - 2 - ethylhexoate, monobutyltin tri - 2 - ethylhexoate, bis(tributyltin)oxide, bis(tributyltin)tetrapropenyl succinate, bis(tributyltin) n-nonyl succinate, bis(tributyltin)malonate, and the corresponding lead and calcium compounds. In general, from about 0.05 to about 5 wt. percent of catalyst should be employed, based on the weight of the polyol.

The composition may also contain suitable conventional fillers such as, for example, amorphous silica, carbon black, sand, calcium carbonate, and similar unreactive organic materials. Suitable pigments such as titanium dioxide, zinc oxide, etc., may also be employed.

The total amount of solid filler should comprise, preferably, from about 30 to about 60 wt. percent of the total composition. Preferably, from about 15 to about 60 wt. percent of the total filler component will consist of calcium oxide.

The present invention will be further illustrated with respect to the following specific examples which are given by way of illustration and not as limitations on the scope of this invention. Where parts are given, they are parts by weight.

Example I

β-Component: Grams
2,000 m.w. polyoxyglycol terminated with ethylene oxide and containing 49 mol percent of primary hydroxyl groups _____ 360
3,000 m.w. polyoxypropylene triol terminated with ethylene oxide and containing 60 mol percent primary hydroxyl groups _____ 80
Calcium carbonate _____ 200
Calcium oxide _____ 200
Titanium dioxide _____ 40
24% lead octoate solution _____ 1
α-Component:
Poly(phenylmethane) isocyanate mixture containing about 40 wt. percent diphenylmethane diisocyanate _____ 85

The β-component is blended until smooth and creamy and the α-component added with stirring. The mixture is degassed under vacuum and poured into a mold. The mixture will cure to a solid state in approximately 10–20 hours and lose surface stickiness in 24 to 96 hours. Both cure and tack elimination are dependent on environmental temperature and humidity. After two weeks at ambient conditions, the cured polymer system exhibited the following mechanical properties:

Tensile strength, p.s.i. _____ 515
Ultimate elongation, percent _____ 130
100% modulus _____ 460
Hardness, Shore "A" _____ 75
Set at break, percent _____ <1

In addition, a piece of the sealant was immersed in hot (80° C.) water for four hours without noticeable deterioration except for a slight swelling. Other formulations with the CaO in the isocyanate component are also suitable. These mixed components are surprisingly stable.

Example II

Grams
Prepolymer prepared by reacting tolylene diisocyanate isomers with 4,000 m.w. polyoxypropylene triol in proportions to give about 2.6 mol percent free isocyanato groups _____ 200
CaCO₃ _____ 75
CaO _____ 75
Pb octoate solution (24% in mineral spirits) _____ 1.5

Grams
2,000 m.w. polyoxypropylene glycol terminated with 10 wt. percent ethylene oxide and containing 50 mol percent of primary hydroxyl groups _____ 90

This preparation has a pot life of 30–60 minutes and cures to a tough, elastic solid with good sealant properties. The tack-free state and nongloss surface are obtained after 24–96 hours, depending on temperature and humidity conditions. A similar preparation withstood, with no ill effects, immersion in water of 80° C. for eight hours.

A further advantage of these sealants containing calcium oxide is the formation of flat as opposed to glossy surface. These sealants can, therefore, be made to blend almost perfectly with flat-finished wall surfaces.

What is claimed is:

1. A method for preparing a tack free polyurethane sealant composition for structural members which comprises mixing an aromatic polyisocyanate with a polyether component in the presence of a filler and calcium oxide, filling the joint to be sealed and permitting the mixture to cure, said aromatic polyisocyanate component having an average functionality within the range from about 2.1 to about 2.5 and being composed of polyphenylmethane polyisocyanate, said polyether component having an average molecular weight within the range of about 1,000 to about 6,000, and containing from about 0 to about 15 wt. percent of ethylene oxide, based on the total weight of the polymer.

2. The polyurethane prepared by the process of claim 1.

3. A polyurethane sealant for structural members having a tack-free surface upon curing consisting essentially of the reaction product of an A component and a B component wherein the A component is an aromatic polyisocyanate and the B component is a mixture of a minor amount of a polyoxypropylene polyether triol with a major amount of a polyoxypropylene diol containing from about 10 to about 60 mol percent of primary hydroxyl groups, the diol having an average molecular weight within the range of about 1,000 to about 5,000 and containing from about 1 to 15 wt. percent of ethylene oxide, based on the total weight of the molecule, the triol having an average molecular weight within the range of about 1,000 to about 6,000 and containing from about 0 to about 15 wt. percent of ethylene oxide, based on the total weight of the polymer, the B component also containing from about 30 to about 60 wt. percent of a filler, about 15 to about 60 wt. percent of said filler being calcium oxide, and wherein the A component and B component are reacted in proportions such that the isocyanato groups and hydroxyl groups will be preseent in the ratio of from about 1.1 to about 1.7 mol equivalents isocyanato groups per mol equivalent hydroxyl groups.

References Cited

UNITED STATES PATENTS

| | | |
|---|---|---|
| 3,061,559 | 10/1962 | Hensen et al. |
| 3,075,926 | 1/1963 | Stewart et al. _____ 260—2.5 |
| 3,201,136 | 8/1965 | Harrison et al. |
| 2,548,780 | 4/1951 | Gary et al. _____ 23—186 |
| 3,154,521 | 10/1964 | Terek et al. _____ 260—40 |

FOREIGN PATENTS 627,182    5/1963    Belgium.

OTHER REFERENCES

Choosing the Right Polyglycol, Dow Chem. Co., Code No. 164–33, August 1956, pp. 10 and 12 (copy in 260—77.5AP).

MORRIS LIEBMAN, *Primary Examiner.*

S. L. FOX, *Assistant Examiner.*

U.S. Cl. X.R.

260—40, 77.5